H. M. KAUFFMAN.
CRANKING DEVICE FOR EXPLOSIVE ENGINES.
APPLICATION FILED MAR. 7, 1914.
1,141,189.
Patented June 1, 1915.
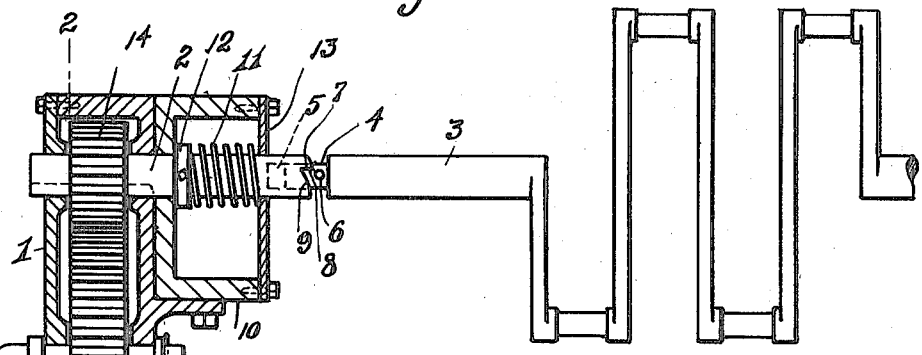
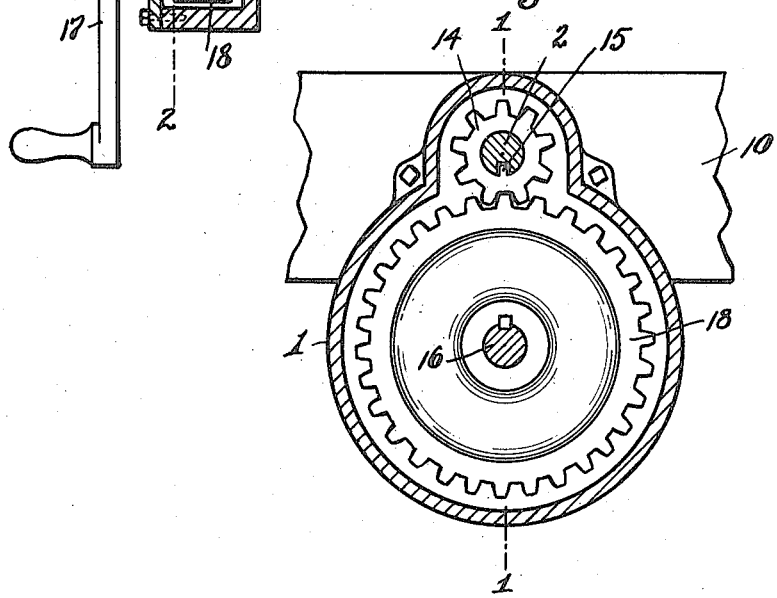
Witnesses:
Irving B. Eames
Lela W. Cook
Horace M. Kauffman
INVENTOR.
By George G. Oltoch,
ATTORNEY.

UNITED STATES PATENT OFFICE.

HORACE M. KAUFFMAN, OF SOUTH BEND, INDIANA.

CRANKING DEVICE FOR EXPLOSIVE-ENGINES.

1,141,189.  Specification of Letters Patent.  Patented June 1, 1915.

Application filed March 7, 1914. Serial No. 823,206.

*To all whom it may concern:*

Be it known that I, HORACE M. KAUFFMAN, a citizen of the United States, residing at South Bend, in the county of St. Joseph and State of Indiana, have invented certain new and useful Improvements in Cranking Devices for Explosive-Engines, of which the following is a specification.

The invention relates to a cranking mechanism for explosive engines, in the use of which all the cylinders of the engine may be cranked by a partial revolution of the hand crank, and the mechanism automatically cut out in the initial explosion.

The improvement contemplates the utilization of a crank stem disposed in line with and adapted for longitudinal movement with respect to the crank shaft, the stem being formed with means for interlocking with the crank shaft at one limit of movement of the stem, said stem being geared with an auxiliary crank shaft provided with the usual crank.

The invention in the preferred form of details will be described in the following specification, reference being had particularly to the accompanying drawings, in which:—

Figure 1 is a view in section partly in elevation, illustrating the improved cranking mechanism operatively connected with the crank shaft of a four-cylinder engine. Fig. 2 is a section on line 2—2 of Fig. 1.

In the preferred embodiment of details, and as will be plain from the accompanying drawings, the improved cranking device includes a gear case 1 suitably fixed with relation to the vehicle frame and preferably of the outline form shown in Fig. 2. In the upper portion of the case is mounted what I term a crank stem 2, the latter being supported in appropriately formed bearings in the case, and adapted for bodily movement transverse the case, as well as rotative movement therein. The crank stem 2 is in line with the crank shaft 3 of the engine, and said crank shaft is formed with a reduced extension 4 adapted to seat in a longitudinally extending channel or recess 5 in the proximate end of the crank stem. The reduced portion of the crank shaft is provided with a radial pin 6, and the proximate edge of the crank stem is formed with a recess 7 having an abutment wall 8 in parallelism with the axis of the shaft and an opposing wall 9 of cam formation, in that it extends from the inner or forward end of the abutment wall 8 into coincidence with the normal edge of the crank stem terminal, as clearly shown in Fig. 1.

The crank case is provided with a sleeve extension 10 encircling the relatively rear portion of the crank stem, and a spring 11 is arranged within the extension, said spring encircling the crank stem, and bearing between a collar 12 secured upon the stem and a bridge plate 13 secured to the free edge of the extension and encircling the shaft or stem. The spring 11 is so tensioned as to normally hold the stem at its limit of forward movement, under which conditions the notch 7 is free of coöperation with the pin 6 so that the stem and crank shaft are not connected, the forward end of the stem projecting a sufficient distance beyond the face of the gear case, when the parts are in normal position to permit of endwise pressure upon the stem to cause the notch 7 to engage the pin 6.

A pinion 14, is arranged upon the crank stem, being secured by a feather or spline 15 to permit independent longitudinal movement, while securing the parts for simultaneous rotary movement. An auxiliary crank shaft 16 is mounted in the gear case below and in alinement with the stem 2, the forward end of the shaft being formed with or having a removable crank 17 whereby the auxiliary crank shaft may be rotated. The crank may be integral with the shaft as shown, or removably connected therewith in any appropriate manner. A gear 18 is keyed upon the auxiliary crank shaft, said gear being of much greater diameter than that of the pinion 14, and remaining at all times in mesh with the latter.

In operation, the crank stem is forced inwardly by the fingers of one hand, and the crank 17 rotated. The movement of the stem causes the notch 7 to engage the pin 6 and the resistance of the pistons in the cylinders serve to insure a frictional contact sufficient to overcome the normal opposing tendency of the spring 11. Owing to the comparative diameters of the gear and pinion, a partial rotation of the gear will turn over all of the cranks of the crank shaft. This operation is ordinarily sufficient to start the engine, and the initial movement of the crank shaft under the explosive effect will release the frictional engagement between the pin and notch, causing the pin to ride on the cam edge 9 and thereby release the crank stem to the influence of the spring 11, returning the stem to normal position.

The improved mechanism provides for a cranking of a plurality of cylinders in a partial turn of the crank, and permits the coöperative engagement of the crank operated parts with the crank shaft by means which are readily operated and controlled in a simple and effective manner.

What is claimed is:—

1. A cranking device comprising a crank shaft, a crank stem in line with the crank shaft, an auxiliary crank shaft arranged below the stem, a gear mounted upon the auxiliary shaft, a pinion mounted upon the stem and at all times in mesh with the gear, said stem having independent longitudinal movement with relation to the pinion, and means for connecting the stem and crank shaft at one limit of movement of the stem.

2. A cranking device comprising a crank shaft, a longitudinally movable crank stem terminally notched and disposed in line with the crank shaft, said shaft being formed in part to fit within the stem, a pin projecting from the shaft to coöperate with the notch in the stem, a pinion arranged upon the stem and the stem being mounted for sliding movement therethrough, an auxiliary crank shaft mounted below the stem and having a crank on one end thereof, and a gear secured upon the auxiliary shaft and meshing with the pinion, the diameter of the gear being materially greater than that of the pinion.

3. A cranking device comprising a crank shaft, including a crank stem in line with the crank shaft, an auxiliary crank shaft arranged below the stem, a gear mounted upon the auxiliary shaft, a pinion mounted upon the stem and at all times in mesh with the gear, said stem having independent longitudinal movement with relation to the pinion, means for connecting the stem and crank shaft at one limit of movement of the stem, and yielding means for normally holding said stem and engine crank shaft in disconnected relation.

In testimony whereof I affix my signature in presence of two witnesses.

HORACE M. KAUFFMAN.

Witnesses:
L. W. COOK,
GEORGE OLTSCH.